(12) United States Patent
Houssat et al.

(10) Patent No.: US 11,247,643 B2
(45) Date of Patent: Feb. 15, 2022

(54) CONNECTING DEVICE FOR CONNECTING A WIPER BLADE TO A DRIVE ARM OF A WIPER SYSTEM FOR A MOTOR VEHICLE

(71) Applicant: Valeo Systèmes d'Essuyage, Le Mesnil Saint Denis (FR)

(72) Inventors: Stéphane Houssat, Issoire (FR); Guillaume Mouleyre, Issoire (FR); Vincent Gaucher, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 80 days.

(21) Appl. No.: 16/728,813

(22) Filed: Dec. 27, 2019

(65) Prior Publication Data

US 2020/0207311 A1 Jul. 2, 2020

(30) Foreign Application Priority Data

Dec. 27, 2018 (FR) ........................................ 1874277

(51) Int. Cl.
*B60S 1/40* (2006.01)
(52) U.S. Cl.
CPC ..... *B60S 1/4048* (2013.01); *B60S 2001/4051* (2013.01)

(58) Field of Classification Search
CPC ............ B60S 1/4048; B60S 2001/4051; B60S 1/3858
See application file for complete search history.

(56) References Cited

U.S. PATENT DOCUMENTS

2013/0192016 A1* 8/2013 Kim ...................... B60S 1/4003
15/250.201

* cited by examiner

*Primary Examiner* — Andrew A Horton
(74) *Attorney, Agent, or Firm* — Osha Bergman Watanabe & Burton LLP (57) ABSTRACT

Connecting device (2) for connecting a wiper arm (1) to a drive arm of a wiper system for a vehicle, comprising at least one connector (5) mounted pivotably relative to a drive arm and including means (20) forming a pivoting interface defining an axis of rotation (18), said connector (5) comprising a plurality of tabs (30) for mechanically connecting the connector to the wiper arm, characterized in that said pivoting interface is longitudinally offset relative to a transverse mid-plane (TMP) of the connecting device, and in that at least one tab is situated on either side of a transverse vertical interface plane (TP) comprising the axis of rotation (18) and parallel to the transverse mid-plane (TMP).

10 Claims, 5 Drawing Sheets

CONNECTING DEVICE FOR CONNECTING A WIPER BLADE TO A DRIVE ARM OF A WIPER SYSTEM FOR A MOTOR VEHICLE

The field of the present invention is that of systems for wiping motor vehicle glazed surfaces. The present invention relates more particularly to a device for connecting a wiper arm to a drive arm of a wiper system, together with a wiper arm comprising such a connecting device.

A motor vehicle is commonly provided with a wiper system to wipe and clean a glazed surface forming part of the motor vehicle, such as a front windscreen or a rear window. The wiper system is intended to prevent the view that a driver of the motor vehicle has of his environment from being disrupted. To this end, the wiper system generally comprises at least one drive arm, which performs an angular back-and-forth movement, and a wiper arm fastened to the drive arm and provided with a wiper blade made from a resilient material and intended to be pressed against the glazed surface to be cleaned.

Regardless of the configuration of the wiper arm, it is attached to the drive arm of the wiper system by a connecting device that generally comprises at least one connector rigidly connected to the wiper arm and an adapter rigidly connected to the drive arm, the adapter and the connector engaging by means of a pivot joint that is intended to allow the pivoting of the wiper arm relative to the drive arm so that the wiper arm is pressed correctly on the glazed surface. The connector is rigidly connected to the drive arm by means of fastening members, particularly by snap-fitting, arranged under the connector and suitable for engaging with corresponding shapes, for example notches formed on the wiper arm.

Conventionally, the connecting device is centred on the wiper arm, and the pivot joint that the connector helps to define is also centred on the wiper arm, i.e. situated longitudinally equidistant from the ends of the wiper arm. In this context, it is conventional that the fastening members described previously are situated on either side of the centre of the wiper arm relative to this longitudinal direction, as close as possible to the axis of the pivot joint.

The present invention aims to propose an alternative to the existing connecting devices and it aims to propose both a connecting device and a wiper arm comprising such a connecting device.

The present invention relates to a connecting device for connecting a wiper arm to a drive arm of a wiper system for a vehicle, comprising at least one connector mounted pivotably relative to a drive arm and including means forming a pivoting interface defining an axis of rotation, said connector comprising a plurality of tabs for mechanically connecting the connector to the wiper arm, characterized in that said pivoting interface is longitudinally offset relative to a transverse mid-plane of the connecting device, and in that at least one tab is situated on either side of a transverse vertical interface plane comprising the axis of rotation and parallel to the transverse mid-plane.

Furthermore, according to one feature of the invention, the plurality of tabs is arranged so that at least one tab is situated on either side of a longitudinal mid-plane.

By convention, throughout this document, the qualifier "longitudinal" applies to the direction in which the wiper arm extends, the qualifier "transverse" applies to a direction substantially perpendicular to the longitudinal direction and joining together the side walls of the connector according to the invention, and the qualifier "vertical" denotes the direction perpendicular to both the longitudinal direction and the transverse direction, i.e. the direction perpendicular to the glazed surface to be cleaned when the wiper arm is pressing on the window.

The term "transverse mid-plane" denotes a transverse plane passing through the middle of the connecting device relative to the longitudinal axis of elongation of the wiper arm and the connector. In other words, the transverse mid-plane is such that it splits the connector of the connecting device into two equal longitudinal halves.

The connecting device can include, in addition to the connector rigidly connected to the wiper arm, an adapter rigidly connected to the drive arm and inserted between this arm and the connector. In this case the adapter is rigidly connected to the drive arm and configured to engage with the connector. The connector includes at least one fastening device configured to mechanically connect the connector to the structural element of the wiper arm, for example by snap-fitting, and it is configured so that it is able to engage with the adapter, the adapter and the connector being mounted pivotably. The connector and the adapter therefore engage with each other to fasten the wiper arm to the drive arm.

"Axis of rotation" is given to mean the axis about which the wiper arm pivots relative to the drive arm. This axis passes through the centre of the pivoting interface, which can consist of the engagement of an orifice and a stud formed on the adapter or the connector respectively.

According to a first configuration of the present invention, the tabs can be equidistant from the transverse vertical interface plane. This ensures even distribution of the pressure on either side of the axis of rotation. The spacing between two opposite tabs, i.e. two tabs located on either side of the transverse vertical interface plane, can be modified so as to adjust the pressure.

According to an alternative or additional configuration, the tabs are situated in the same half of the connecting device. In such a configuration, each tab is situated at a distance from the axis of rotation that is specific to it, the spacing between the opposite tabs being variable depending on the desired pressure, and the fastening device formed by the plurality of tabs can be configured envisaging alternatives in which tabs in the same pair are offset from each other along the longitudinal axis of the wiper arm. This offsetting will however be subject to two limits, namely that the fastening device remains configured so that at least one tab is situated on each side of the transverse vertical interface plane, and that the tabs must be located in the same half of the connecting device.

Such a configuration in no way rules out the first configuration. Thus, the fastening device can be arranged so that the tabs are simultaneously equidistant from the transverse vertical interface plane and located in the same half of the connecting device.

According to one feature of the invention, the connector includes a skirt configured to be connected to the wiper arm and a joining block configured to be connected to the adapter, said skirt including side walls situated at each transverse end of a base and from which the tabs extend, said tabs being arranged so that at least one tab is incorporated into each side wall.

In such fastening members, the tabs can consist of a protrusion of material emerging from the side walls of the skirt of the connector, said tabs being arranged so that they form a bulge extending towards the opposite side wall and so that they are accommodated by the skirt.

According to one feature of the present invention, the fastening device can comprise at least two pairs of tabs, the tabs in the same pair being situated on either side of a longitudinal mid-plane of the wiper arm. More particularly, the tabs in the same pair can be symmetrical relative to said longitudinal mid-plane. In such a connecting device, the pairs of tabs are arranged on the skirt of the connector so that at least one pair of tabs is situated on either side of the axis of rotation.

According to one feature of the connecting device, the connector is formed from a first fastening segment including all of the tabs forming the fastening device engaging with the wiper arm and the means forming a pivoting interface, together with a second free segment without fastening tabs. The fastening segment thus performs a function of giving the connector mechanical strength, and the forces between the drive arm and the wiper arm are transferred through this fastening segment to press the wiper arm onto the surface to be cleaned, while the free segment essentially has an aesthetic function aimed at forming the link between the fastening segment and a deflector or deflector portion of the wiper arm.

Each segment of the connector can include, on the free longitudinal end thereof, a cut-out suitable for engaging with a deflector or deflector portion of the wiper arm, so that this deflector or deflector portion is partially overlapped by the connector at each of these ends.

According to one feature of the present invention, the tabs of the fastening device are slotted in order to help to define a groove for receiving a stiffening element of the wiper arm, the groove extending along a longitudinal axis parallel to the axis of the wiper arm.

The present invention also comprises a wiper arm, provided with a connecting device as previously disclosed.

A wiper arm according to the invention comprises at least one stiffening element, at least two deflectors or deflector portions and a flexible wiper blade, together with a support element associated with the different components of the wiper arm, said wiper arm being connected to a drive arm of a wiper system for a vehicle by means of a connecting device as previously disclosed. In such a wiper arm, the connecting device is arranged so that the transverse vertical interface plane has a separation distance relative to a transverse mid-plane of the wiper arm.

The wiper arm extends longitudinally along an axis of elongation. The different elements of the wiper arm such as the support element, the stiffening element, for example a metal strip, also have an elongated structure and are configured so that they engage with the connecting device.

Similarly, the deflectors or deflector portions have an elongated shape and extend along the axis of elongation of the wiper arm so that the deflectors or deflector portions longitudinally flank the connecting device while engaging with said connecting device. Hereinafter, the term deflector or deflector portion will be used equally to refer either to two separate elements each situated on one side of the connecting device or to a single element having a recess at the centre thereof to accommodate the connecting device. Without departing from the scope of the invention, either of the structures may be selected, it being understood that the deflector or the deflector portions are arranged to convert a force generated by an air flow flowing along the glazed surface into a force pressing the wiper arm against the glazed surface.

Support element associated with the different components of the wiper arm is used equally to refer to the fact that the support element is integrally formed with one of the components, for example deflector portions, and the fact that the support element receives a component manufactured separately, for example the wiper blade.

Additionally, two end pieces can be incorporated into each of the longitudinal ends of the wiper arm.

According to one feature of the invention, the support element includes notches with a shape and dimensions that complement those of the tabs of the connector, so that said tabs lock the support element longitudinally. The notches incorporated into the support element will form a stop against a side face of the tabs, thus limiting any movement of the support element on the longitudinal axis.

These notches can be configured so that the tabs of the connector are in contact in these notches with the stiffening element, said tabs including a slot for accommodating and vertically locking the stiffening element.

The arrangement and features specific to the wiper arm of the present invention limit the incorporation of the notches to the support only. The stiffening element does not therefore require such arrangements. It will simply be incorporated into the wiper arm by sliding, along the longitudinal axis of extension of the wiper arm, into the support and into the groove formed by the skirt of the connector and the tabs.

In a wiper arm according to the present invention, the deflectors or deflector portions, the strip and the blade are symmetrical relative to a transverse plane passing through the middle of the wiper arm. The connector is arranged on the wiper arm so that the fastening segment, comprising the fastening device and the pivoting interface, is offset relative to the transverse mid-plane of the wiper arm, while the free segment forms a part with equivalent dimensions to the fastening segment but without means forming a pivoting interface and means for fastening to the wiper arm. Such a configuration of the connector retains the symmetry of the wiper arm. It is thus unnecessary to adopt asymmetrical deflectors or deflector portions to ensure that they engage with a connector that is offset relative to the middle of the wiper arm, the connector extending here over a sufficient length to cumulatively ensure the offsetting of the pivot and the fastening device, the overlapping of the middle of the wiper arm and the continuity of the connector with symmetrical deflectors or deflector portions.

Further features, details and advantages of the invention will become apparent from the following detailed description and from several embodiments given as non-limitative examples with reference to the attached schematic drawings, in which.

Firstly, it must be noted that although the figures disclose the invention in detail for the implementation thereof, they can of course be used to further define the invention if applicable. It must also be noted that, in all of the figures, similar elements and/or elements performing the same function have the same reference sign.

Furthermore, with reference to the orientations and directions previously defined, the longitudinal direction will be represented, in the figures that so require, by the axis Ox, the vertical direction will be represented by the axis Oy, and the transverse direction will be represented by the axis Oz. These different axes together define an orthonormal frame of reference Oxyz shown on some of the figures. In this frame of reference, the qualifiers "top" or "upper" will be represented by the positive direction of the axis Oy, the qualifiers "bottom" or "lower" being represented by the negative direction of this same axis Oy.

Figure 1:
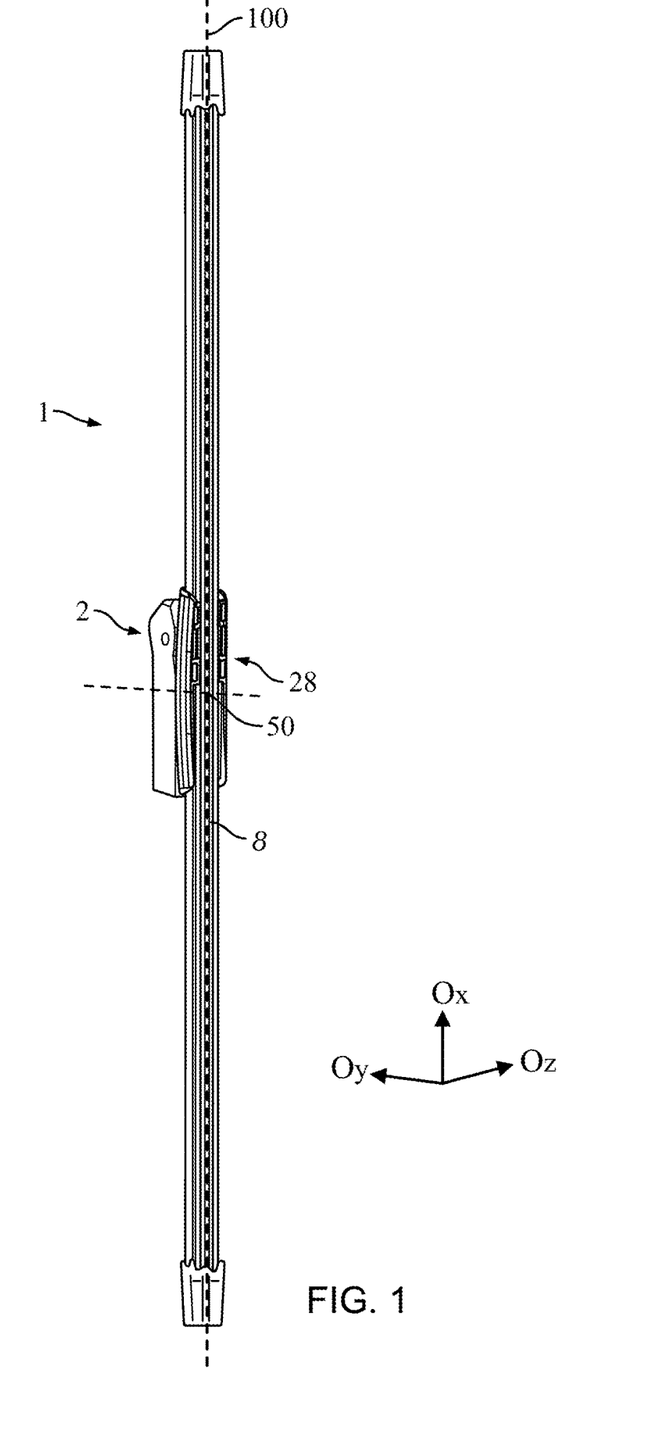
[FIG. 1] is a general perspective view of a wiper arm comprising a connecting device according to the present invention.
Figure 2:
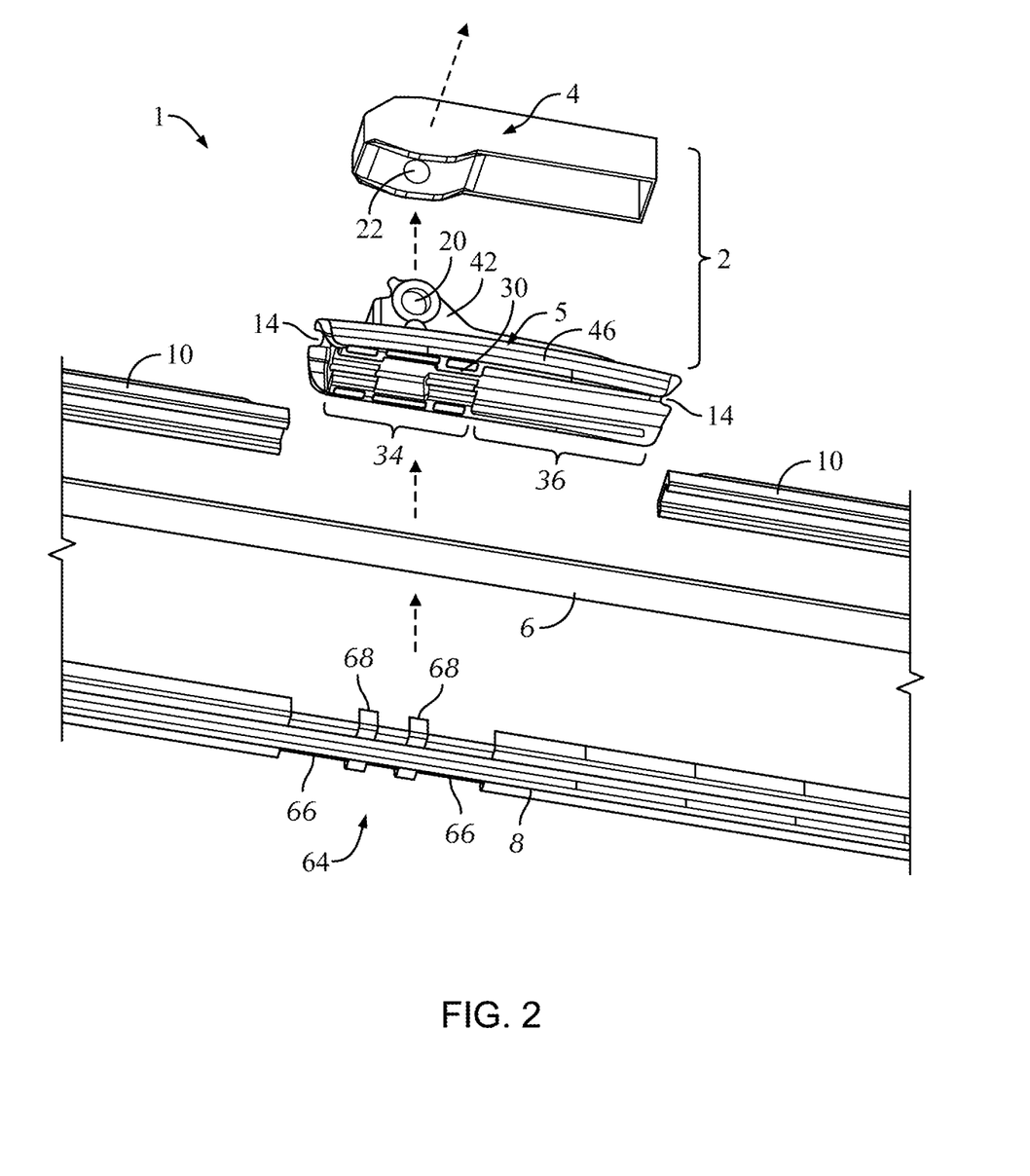
[FIG. 2] is an exploded view of the wiper arm in [FIG. 1] provided with the connecting device, the view being centred on the zone in which the connecting device engages with the wiper arm.

[FIG. 1] and [FIG. 2] illustrate a wiper arm 1 comprising a connecting device 2 according to the present invention, here including an adapter 4 and a connector 5 mounted pivotably relative to each other.

More generally, the connecting device includes at least one connector 5 rigidly connected to the wiper arm and configured so that it can be pivotably mounted relative to a drive arm of the wiper arm. In the example illustrated, the connecting device 2 includes the connector 5 and an adapter 4, forming an intermediary between the drive arm and the connector. It will be understood that without departing from the scope of the invention as described below, provision can be made for the pivoting of the connector relative to the drive arm to take place directly between a drive arm that has a rotation shaft and the connector, without the presence of an adapter being necessary.

The wiper arm 1 extends along a longitudinal axis 100, also called the axis of elongation of the wiper arm 1, parallel to the axis Ox. It includes at least one stiffening element 6, also called a strip, a support element 8, at least two deflectors 10 and a flexible wiper blade 12 (visible in FIGS. 6 and 7).

The stiffening element 6 extends longitudinally in an appropriate cavity of the support element to give the wiper arm a degree of flexibility allowing the wiper arm to be pressed on the glazed surface.

In the example illustrated, at least two deflectors 10 are incorporated into the wiper arm 1, said deflectors 10 having an elongated shape and extending along the axis of elongation of the wiper arm 1. They are arranged so that they longitudinally flank the connecting device 2 and have, on at least one end, a shape that complements the shape of a cut-out 14 formed at each of the longitudinal ends of the connector 5. As has been specified above, it can be envisaged, without departing from the scope of the invention, that these two deflectors form a single part having a recess accommodating the connector 5, so that deflector portions are situated on either side of the connector.

The wiper arm is additionally provided with end pieces 16 situated respectively at each of the longitudinal ends of the wiper arm, these end pieces having in particular the function of retaining the strip longitudinally.

A longitudinal mid-plane LMP of the wiper arm and a transverse mid-plane TMP of the wiper arm are defined as follows. A longitudinal mid-plane LMP splits the wiper arm into two longitudinal parts extending symmetrically on either side of this longitudinal mid-plane, which passes through each of the end pieces and the support element. A transverse mid-plane TMP splits the wiper arm substantially in the middle thereof relative to the longitudinal dimension, and this transverse mid-plane extends perpendicular to the support element in line with the connecting device.

As has been specified above, the connecting device 2 includes a connector 5 and an adapter 4.

The connector 5 and the adapter 4 extend longitudinally along the longitudinal axis of elongation of the wiper arm and are suitable for engaging with each other, the adapter 4 being configured to be rigidly connected to a drive arm of the wiper arm and the connector 5 being configured to be rigidly connected to the wiper arm. The adapter 4 is configured, in particular by an appropriate U shape, to overlap the connector 5 in the assembled position, as can be seen in [FIG. 1].

In addition, the adapter 4 and the connector 5 are configured so that they can be pivotably mounted relative to each other. The pivoting interface that exists between the adapter 4 and the connector 5 makes it possible to define an axis of rotation 18 about which the rotation of the wiper arm relative to the drive arm takes place by extension. The axis of rotation 18 extends so that it is parallel to the transverse axis Oz.

Here, the pivoting interface is produced by the combination of an orifice 20 formed in the connector and a stud 22 protruding from an inner face of the adapter as can be seen in [FIG. 2]. It will be understood that the pivoting interface can, without departing from the scope of the invention, be produced by another corresponding stud and orifice arrangement, provided that the respective positioning and sizing thereof allows the connector to pivot relative to the adapter.

The connecting device 2 is arranged so that it contributes to a generally symmetrically layout of the wiper arm 1. More particularly, at least the connector 5 extends longitudinally between a first longitudinal end 24 and an opposite second longitudinal end 26 so that it is centred on the transverse mid-plane TMP of the wiper arm, with the first longitudinal end 24 of the connector being situated at a distance relative to a first end-piece 16 that has a value equal to the distance value between the second longitudinal end 26 and the second end piece.

The wiper arm and the connecting device 2 are configured according to the invention so that the pivoting interface 20, 22 and the resulting axis of rotation 18 are offset relative to the centre of the wiper arm, i.e. they are not centred on the transverse mid-plane TMP of the wiper arm. In other words, the axis of rotation 18 defined by this pivoting interface, and about which the connector pivots relative to the adapter, extends substantially parallel to the transverse mid-plane TMP and at a separation distance S therefrom. As illustrated in [FIG. 3], a transverse vertical interface plane TP can thus be defined, parallel to the transverse mid-plane TMP and comprising the axis of rotation 18.

The connecting device 2 according to the invention is thus specific in that the connector 5 is centred on the traverse mid-plane TMP having means forming the pivoting interface with the adapter that are offset relative to this transverse mid-plane, defining the aforementioned transverse vertical interface plane TP that extends at a non-zero separation distance S from the transverse mid-plane TMP.

Through this particular arrangement, the connector 5 is suitable for engaging with a symmetrically-configured wiper arm, with deflectors arranged symmetrically on either side of the connector, and for engaging with an adapter and a drive arm end in a pivoting zone offset relative to this transverse mid-plane.

The connector 5 and the fastening thereof to structural elements of the wiper arm will now be described in more detail with reference to FIGS. 1 to 5. In particular, the position of the means allowing this fastening relative to the aforementioned pivoting interface and relative to the transverse mid-plane TMP and the transverse vertical interface plane TP will be described.

The connector 5 includes a fastening device 3 engaging with structural elements of the wiper arm 2, for example the support element 8. This fastening device 3 comprises a plurality of tabs 30 arranged so that at least one tab 30 is situated on either side of the transverse vertical interface plane TP and so that at least one tab is situated on either side of the longitudinal mid-plane LMP. It will be understood from the above that the fastening device 3 could comprise just two tabs, with one tab situated on a given side of the longitudinal mid-plane LMP and on a given side of the transverse vertical interface plane TP, and with the other tab situated on the other side of the longitudinal mid-plane LMP and on the other side of the transverse vertical interface plane TP.

It should be noted that in the above, the feature according to which at least one tab is situated on either side of the transverse vertical interface plane TP can be extended in that one of the tabs extends partially on the transverse vertical interface plane TP, another tab extending at a longitudinal distance from this transverse vertical interface plane.

In the example shown in the figures, the fastening device comprises four tabs 30. The tabs 30 located on either side of the longitudinal mid-plane LMP form a pair of tabs 32 configured here so that each tab 30 in this pair 32 is symmetrical with the second tab 30 in the pair 32 relative to the longitudinal mid-plane LMP. More generally, it will be understood according to the invention that two tabs form a pair provided that they act on substantially the same longitudinal portion of the wiper arm to fasten the connector to the wiper arm, on either side of the longitudinal mid-plane LMP. In such an arrangement, the fastening device 3 comprises a first pair of tabs situated on one side of the transverse vertical interface plane TP and a second pair of tabs situated on the opposite side of this transverse vertical interface plane TP.

The connector 5 can thus be divided into two separate segments, including a first segment, called the fastening segment 34, comprising the fastening device 3 and therefore the tabs 30, and a second segment, called the free segment 36, longitudinally extending the fastening segment 34. In the example illustrated, the fastening segment and the free segment 36 extend longitudinally on either side of the transverse mid-plane TMP. As mentioned previously, each segment of the connector includes at the free longitudinal end thereof a cut-out 14 the shape of which is suitable for engaging with one of the deflectors of the wiper arm.

More particularly, the connector 5 comprises a skirt 40 having an inverted U-shaped profile in order to engage with the wiper arm and a joining block 42 situated protruding from the skirt 40 in order to engage with the adapter.

Figure 3:
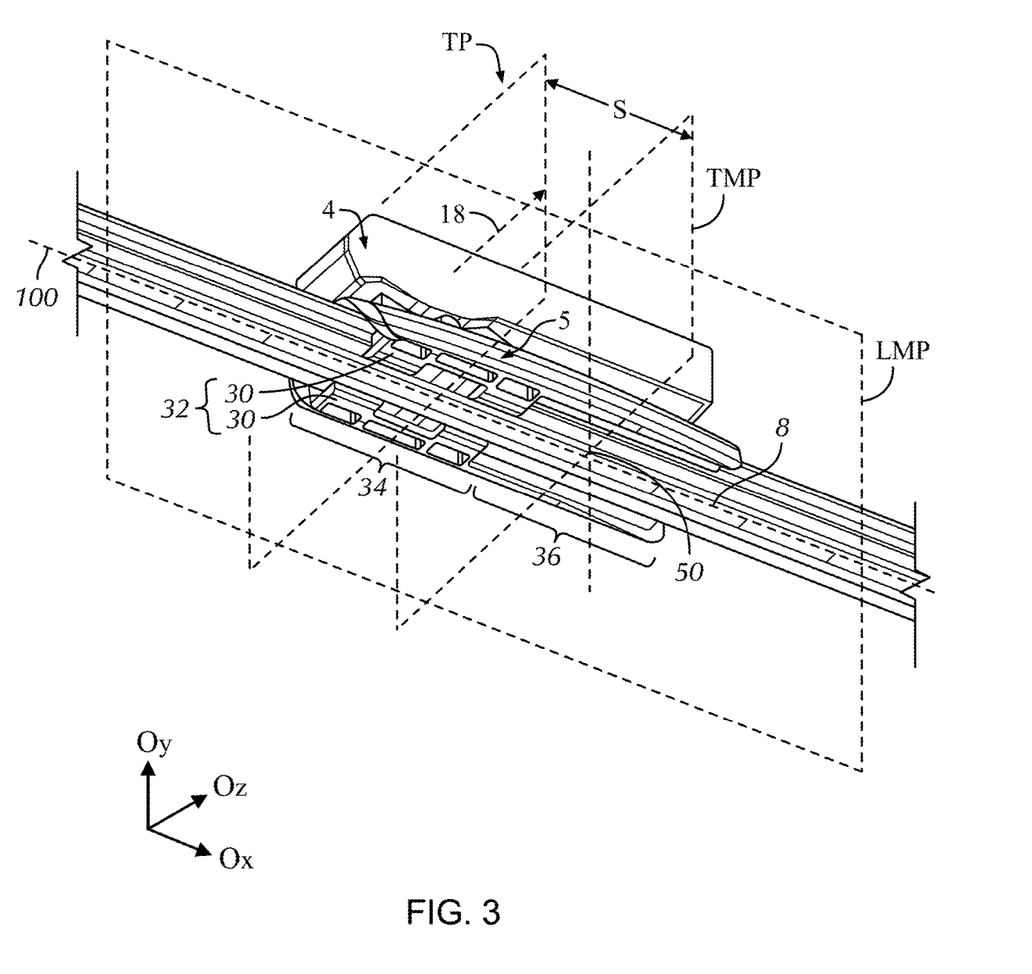
[FIG. 3] is a perspective view of a detail of the wiper arm in [FIG. 1] showing more particularly the connecting device and the engagement between the adapter, the connector and a support element of the wiper arm.
Figure 5:
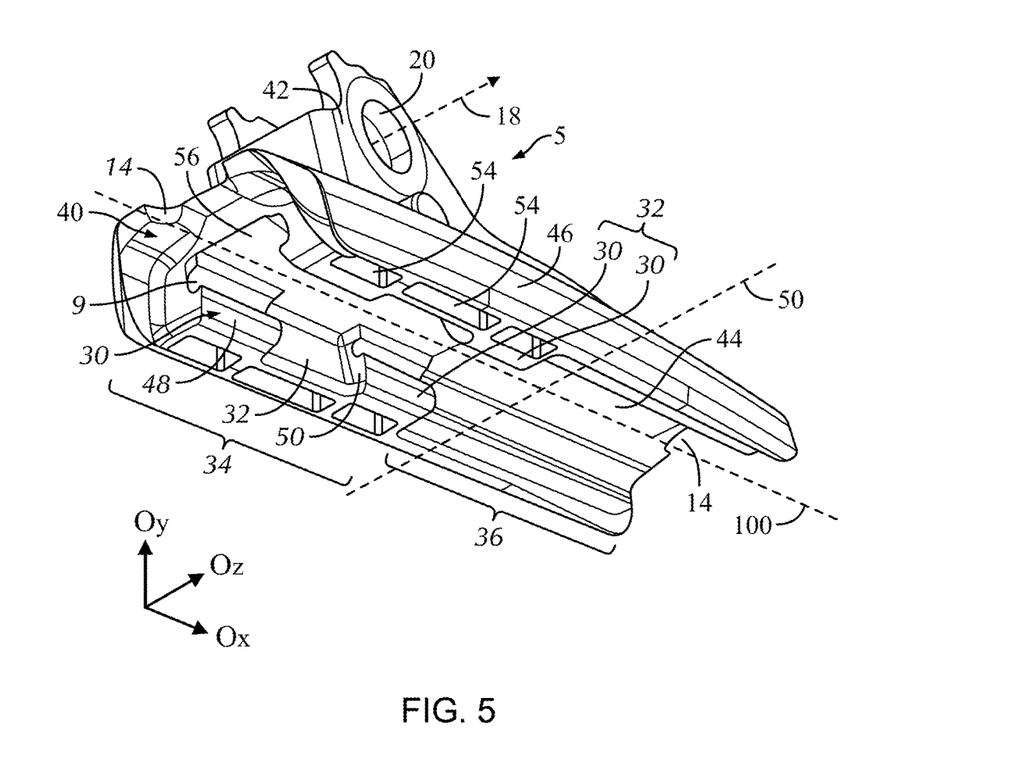
[FIG. 5] is a perspective view of the connector illustrated in [FIG. 3]

Here, the joining block 42 takes the form of two parallel walls each extending protruding from the base, and this joining block includes means, including an orifice 20 arranged in one of the walls that is visible in FIGS. 2, 3 and 5, that contribute to forming the pivoting interface with the adapter. The axis of rotation 18, which extends so that it is parallel to the transverse axis Oz, passes through the centre of this orifice 20.

The skirt 40 includes a base 44 extended substantially perpendicular to its transverse ends by side walls 46 extending towards the wiper arm. These side walls bear at their free end the aforementioned tabs 30.

The tabs 30 of said fastening device 3 consist of a protrusion of material emerging from the side walls 46 substantially perpendicular thereto, so that they form a bulge extending towards the opposite side wall 46, inside the "U" of the skirt 40.

More particularly, the tabs 30 each assume the form of a parallelepipedal, or substantially parallelepipedal, block of material incorporating a chamfer 48 made in the lower part of the tab, at the free end of the side walls 46, and a slot 9, made in the inner face of the block forming the tab, i.e. the face facing the opposite side wall. The slot 9 is intended to engage with the stiffening element 6 of the wiper arm.

Figure 4:
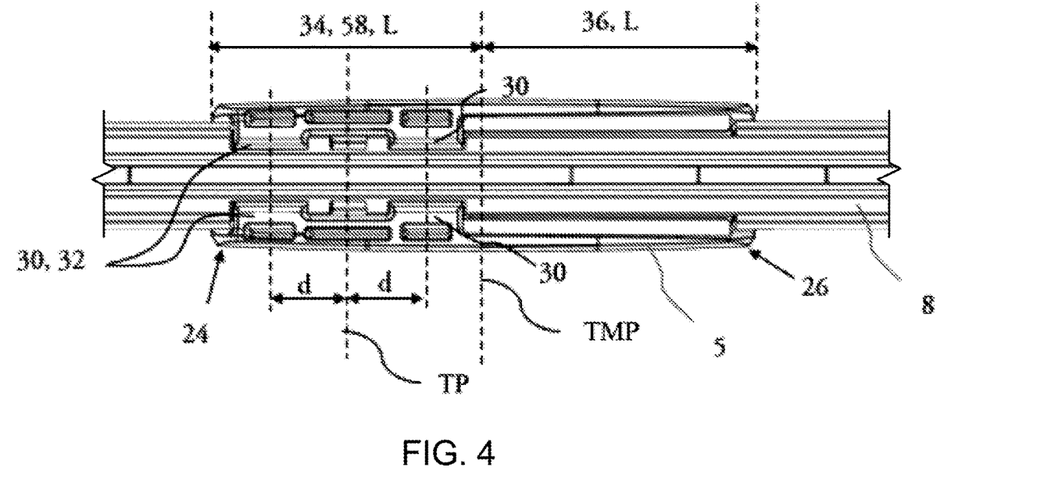
[FIG. 4] is a bottom view of the detail of the wiper arm in [FIG. 3]

As illustrated in particular in [FIG. 3] and [FIG. 4], the tabs 30 are sized so that they are accommodated in notches formed in the support element 8. Each longitudinal end edge 50 of a tab 30 plays the role of a stop body engaging with the walls defining these notches in the support element, thus preventing any longitudinal movement, along the axis 100, of said support element relative to the connector 5.

The height of the tab 30 is defined as being the dimension of the tab 30 extending from the lower end of the side walls 46 to the base 44 of the skirt 40. The width of the tab 30 is defined as the dimension of the tab measured along the longitudinal axis 100 of the connecting device 2.

The longitudinal spacing between the tabs 30 situated on either side of the transverse vertical interface plane TP, i.e. tabs 30 that do not belong to the same pair 32, can be changed, the example illustrated being in no way limitative.

The portion of the skirt 40, and more particularly of its side walls 46, joining two tabs 30 emerging from the same side wall 46 will be described as a joint portion 52. The joint portions 52 have a thickness that is less than the thickness of the tabs 30, corresponding to their dimension of protrusion towards the inside of the skirt 40, and a thickness that is greater than the thickness of the walls 46 on the free segment 36 of the connector 5.

The tabs 30, like the joint portions 52, can incorporate a hollow 54, open onto the lower part of the connector 5 and extending vertically in the tabs 30 and the joint portions 52 respectively. The same applies to the side walls 46 of the skirt 40. Such a hollow 54 gives the elements greater flexibility and increases their ability to deform, particularly at the time of assembly of the connector onto the support element 8 and the associated stiffening element 6.

The skirt 40 of the connector 5 and the slots 9 formed in two tabs of the same pair of tabs contribute to defining, in the fastening segment 34, a groove 56 suitable for receiving the stiffening element of the wiper arm 1. The groove 56 extends along the longitudinal axis 100 of the wiper arm and, as illustrated in [FIG. 5], is flanked in succession by a first pair of tabs, the joint portions 52 and a second pair of tabs. More particularly, the stiffening element is housed in the groove 56 of the skirt 40, vertically flanked by the base 44 of the skirt 40 of the connector 5 and by an assembly formed by the tabs 30 and the support element.

In the example illustrated, the pairs of tabs 32 of the fastening device are located on either side of the transverse vertical interface plane TP comprising the axis of rotation 18, and can each be situated at the same distance from said plane. This equidistant arrangement contributes to the even distribution of the pressure exerted on the wiper arm, on either side of the axis of rotation 18. This configuration of the fastening device 3 is in particular visible in [FIG. 4], with a distance d between the transverse vertical interface plane TP and each tab, the distance d here being measured between the plane and the longitudinal centre of the tab in question. In other words, in this equidistant arrangement, one pair of tabs consists of the mirror image of the other pair of tabs relative to the transverse vertical interface plane TP.

It will be understood that here, this configuration is illustrated for a connector comprising four tabs 30, i.e. two pairs 32 of tabs 30 arranged equidistant from the transverse vertical interface plane TP, but that the connector can be provided with a fastening device with two tabs, with one tab situated on each side of the transverse vertical interface plane TP, these two tabs being situated equidistant from this plane, without departing from the scope of the invention.

In addition, other variants not illustrated could be implemented without departing from the scope of the invention, for example by longitudinally offsetting two tabs in the same pair from each other, provided that each pair is situated on one side of the transverse mid-plane. In this case, the distance d mentioned for the notion of equidistance of the tabs would be measured between the transverse vertical interface plane TP and a mean longitudinal dimension of the tabs in a given pair.

In addition, the connecting device 2 illustrated in the figures is configured so that all of the tabs 30 are arranged in the same half H1 of the connector 5 relative to its longitudinal dimension. [FIG. 4] particularly shows this feature, so that all of the tabs are situated in the same half of the wiper arm 1, this half being delimited by the aforementioned transverse mid-plane TMP. The free segment 36 of the connector 5 extends from the transverse mid-plane TMP, over a length L with a value substantially equivalent to the value of the length of the fastening segment 34 of the connector 5. In this configuration, the half H1 of the connector 5 in which all of the tabs are situated is the half in which the block 42 for joining to the adapter is situated, on the other side of the base 44. In other words, the tabs are all positioned in the same half of the connector additionally holding the means of pivoting with the adapter.

It should be noted that a connecting device according to the invention can combine the two configurations that have just been described, as shown in the figures of the present invention. In this case, the tabs 30 of the connecting device 2 are arranged so that the pairs of tabs are equidistant from each other relative to the transverse vertical interface plane TP and so that all of the tabs are located in the same half H1 of the connector 5, forming the fastening segment.

Of course, the invention covers a connecting device in which only one of the configurations that have just been described is implemented, namely pairs of tabs equidistant from each other relative to the transverse vertical interface plane TP or all of the tabs located in the same half H1 of the connector 5.

Figure 6:
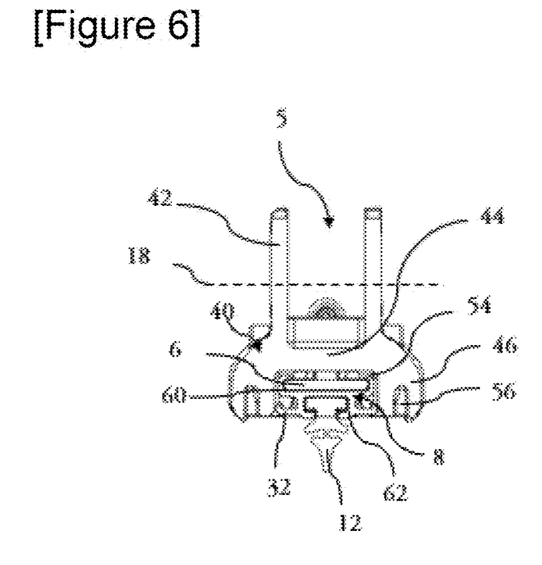
[FIG. 6] is a transverse cross-section of the wiper arm provided with the connecting device, showing a section of the connector without fastening tabs by means of which the connector is able to be rigidly connected to the wiper arm.
Figure 7:
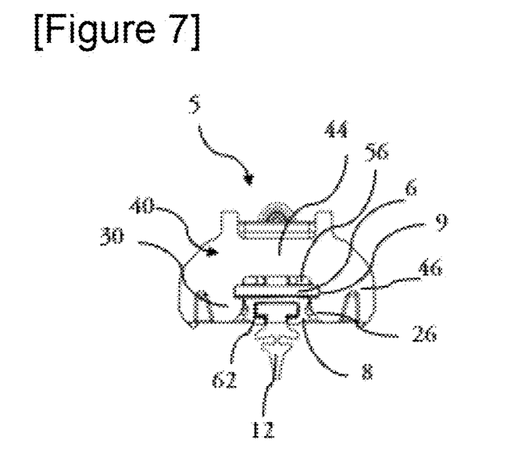
[FIG. 7] is a transverse cross-section of the wiper arm provided with the connecting device, at a pair of fastening tabs by means of which the connector is able to be rigidly connected to the wiper arm.

[FIG. 6] and [FIG. 7] illustrate the relative arrangement of the structural elements of the wiper arm 1, respectively at a transverse cross-section that does not comprise tabs 30 and then at a transverse cross-section comprising a pair 32 of tabs 30. For greater clarity, these last two figures do not include the deflectors or the adapter.

The support element 8 comprises a first cavity 60 suitable for receiving the stiffening element 6 and a second cavity 62 suitable for accommodating a heel of the wiper blade 12 to hold it and allow it to be pressed against the glazed surface to be cleaned. The second cavity 62 shares a common base with the first cavity 60 and these cavities are superposed so that when the connector 5 is fastened to the wiper arm, the first cavity and the stiffening element extend up to the slots 9 formed in each of the tabs 30.

More particularly, the first cavity is delimited by side arms, not shown in the figures, that at least partially overlap the stiffening element 6 to lock it vertically relative to the support element 8.

As illustrated in [FIG. 2], the support element 8 has an interrupted profile in a longitudinal mid-zone 64 suitable for being overlapped by the connector 5 of the connecting device. More particularly, the support element includes notches 66 made from the longitudinal edges of the support element in equivalent quantity and dimensions to the quantity and dimensions of the tabs of the connectors. In this longitudinal mid-zone, the stiffening element 6 is uncovered. As illustrated in the figures, the notches 66 therefore have an offset, relative to the middle of the wiper arm, identical to the offset observed for the pivoting interface and for the tabs of the fastening device.

The support element 8 additionally includes tongues 68, visible in [FIG. 2], that have, in the cross-sectional view in [FIG. 6], an identical shape and function to the shape and function of the aforementioned side arms. It will be understood that when the connector is assembled on the wiper arm, these tongues 68 extend in the joint portion connecting two tabs 30 located on the same side wall 46 and act as a longitudinal stop by coming into contact with the side edges of the tabs 30.

It can be seen from the above that the fastening device 2 formed on the connector 5 by means of the tabs 30 is suitable for engaging with the stiffening element through the notches formed in the support element, so as to hold the connector in position transversely and vertically relative to the wiper arm, the walls defining these notches contributing by stopping against the tabs to holding the connector in position longitudinally relative to the wiper arm. It will be noted that the stiffening element 6 does not require any specific arrangements, such as notches, to be able to engage with the connector 5 and more particularly the fastening device 2.

It will be understood from reading the above that the present invention proposes a device for connecting a wiper arm to a drive arm, for a wiper system for a motor vehicle, that is particular in that it is configured to ensure the even distribution of the pressure exerted on the wiper arm in the context of a pivoting interface offset from the centre of said wiper arm.

The specific arrangement of the tabs of the fastening device as described and illustrated, i.e. the position of the tabs equidistant from a transverse pivoting plane and/or the position of the tabs in the same half of the connector also holding the means of pivoting with the adapter, contributes to such rebalancing and thus ensures even wiping over the entire length of the wiper arm.

Such designs have the advantage of preventing a pressure imbalance that could arise from a joint between the drive arm and the wiper arm such that the pivoting interface is offset, and thus prevent an imbalance of the wiper arm as a whole that could lead to a lack of wiping quality.

The invention is not however limited to the means and configurations described and illustrated herein, and it also extends to all equivalent means and configurations and to any technically effective combination of such means. In particular, the shape, spacing or dimensions of the tabs can be modified without detracting from the invention, provided that the arrangement of said tabs complies with one and/or the other of the configurations relative to the transverse vertical interface plane as described in the present document.

The embodiments described above are in no way limitative; it is possible in particular to envisage variants of the invention comprising only a selection of features described below in isolation from the other features mentioned in this document, if this selection of features is sufficient to confer a technical advantage or to differentiate the invention with respect to the state of the prior art.

The invention claimed is:

1. A connecting device for connecting a wiper arm to a drive arm of a wiper system for a vehicle, comprising:
   at least one connector mounted pivotably relative to a drive arm and including:
      means forming a pivoting interface defining an axis of rotation, and
      a plurality of tabs for mechanically connecting the connector to the wiper arm,
      wherein said pivoting interface is longitudinally offset relative to a transverse mid-plane of the connecting device, and
      wherein at least one tab is situated on either side of a transverse vertical interface plane comprising the axis of rotation and parallel to the transverse mid-plane.

2. The connecting device according to claim 1, comprising two tabs are located on either side of the transverse vertical interface plane equidistant from the transverse vertical interface plane.

3. The connecting device according to claim 2, wherein the two tabs are situated in the same half of the connecting device.

4. The connecting device according to claim 3, wherein the connector includes a skirt configured to be connected to the wiper arm and a joining block configured to be connected to the adapter, said skirt including side walls situated at each transverse end of a base and from which the tabs extend, said tabs being arranged so that at least one tab is incorporated into each side wall.

5. The connecting device according to claim 1, further comprising at least two pairs of tabs, the tabs in a same pair being situated on either side of a longitudinal mid-plane (LMP) of the wiper arm.

6. The connecting device according to claim 1, wherein the connector is formed from a first fastening segment including the at least one tab forming a fastening device engaging with the wiper arm and the means forming a pivoting interface, and from a second free segment without fastening tabs, each segment including, on its free longitudinal end, a cut-out for engaging with a deflector or a deflector portion of the wiper arm.

7. A wiper arm comprising:
   at least one stiffening element;
   at least two deflectors or deflector portions; and
   a flexible wiper blade, together with a support element associated with the different components of the wiper arm,
   said wiper arm being connected to a drive arm of a wiper system for a vehicle by means of a connecting device according to claim 1,
   wherein the connecting device is arranged so that the transverse vertical interface plane has a separation distance relative to a transverse mid-plane of the wiper arm.

8. The wiper arm according to claim 7, wherein the support element includes notches with a shape and dimensions that complement those of the tabs of the connector, so that said tabs lock the support element longitudinally.

9. The wiper arm according to claim 8, wherein the notches are configured so that the tabs of the connector are in contact in these notches with the stiffening element, said tabs including a slot for accommodating and vertically locking the stiffening element.

10. The wiper arm according to claim 7, wherein the deflectors or deflector portions are symmetrical relative to the transverse mid-plane of the wiper arm, and wherein the connector is formed from a first fastening segment including all tabs forming a fastening device engaging with the wiper arm and the means forming the pivoting interface, and from a second free segment without fastening tabs, each segment including, on its free longitudinal end, a cut-out for engaging with a deflector or a deflector portion of the wiper arm, with the second free segment extending between the transverse mid-plane and one of the deflectors or deflector portions.

* * * * *